United States Patent
Belinky

(10) Patent No.: US 6,616,168 B2
(45) Date of Patent: Sep. 9, 2003

(54) RELEASABLE BALL HITCH SYSTEM

(75) Inventor: Jacob S. Belinky, Carleton, MI (US)

(73) Assignee: Draw-Tite, Inc., Canton, MI (US)

( * ) Notice: Subject to any disclaimer, the term of this patent is extended or adjusted under 35 U.S.C. 154(b) by 0 days.

(21) Appl. No.: 09/931,480

(22) Filed: Aug. 16, 2001

(65) Prior Publication Data

US 2003/0034633 A1 Feb. 20, 2003

(51) Int. Cl.[7] .................................................. B60D 1/06
(52) U.S. Cl. ..................................... 280/511; 280/491.5
(58) Field of Search ............................. 280/511, 491.1, 280/491.5

(56) References Cited

U.S. PATENT DOCUMENTS

| | | | | |
|---|---|---|---|---|
| 4,201,400 A | * | 5/1980 | Hoogenbosch | 280/511 |
| 4,433,854 A | * | 2/1984 | Smith | 280/511 |
| 4,522,421 A | * | 6/1985 | Vance | 280/511 |
| 5,280,941 A | * | 1/1994 | Guhlin | 280/511 |
| 5,741,022 A | * | 4/1998 | Wass et al. | 280/511 |
| 6,447,000 B1 | * | 9/2002 | Dick et al. | 280/511 |

* cited by examiner

*Primary Examiner*—Daniel G. DePumpo
(74) *Attorney, Agent, or Firm*—McDonald Hopkins Co. LPA

(57) ABSTRACT

A removable ball goose hitch system. The ball member includes a ball portion and a body portion. A plurality of locking ball bearings in the body portion are engaged by an internal plunger that is actuated by a screw that protrudes from the top of the ball portion. The locking ball bearings are adapted to be engaged with a receiver in the hitch mechanism on the vehicle. When the screw is unthreaded, the ball bearings are allowed to retract and the hitch ball can be removed. All moving parts of the mechanism are located in the ball member and improper hookups are prevented.

11 Claims, 3 Drawing Sheets

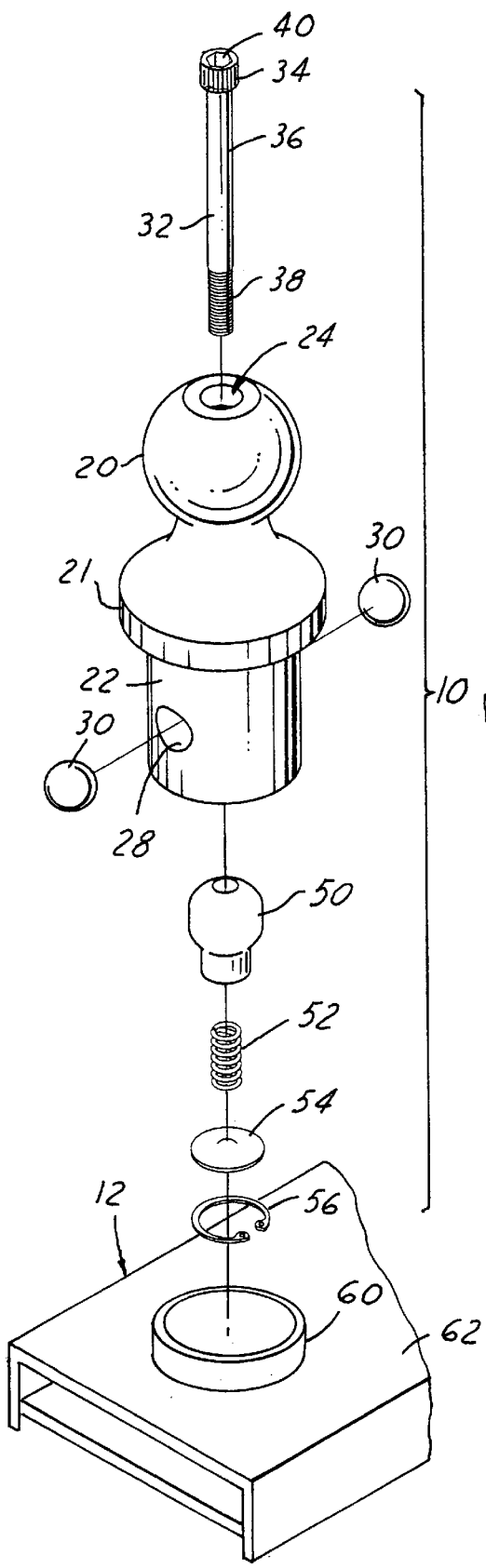
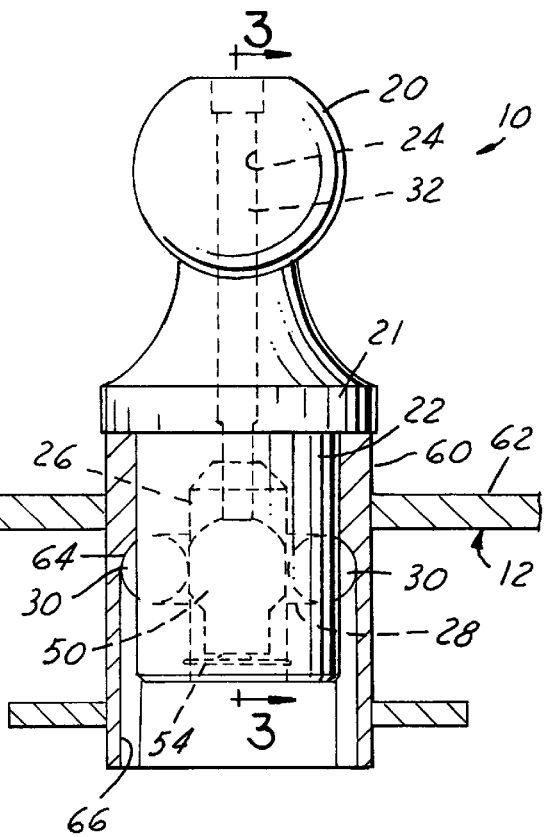
FIG.2
FIG.1

RELEASABLE BALL HITCH SYSTEM

TECHNICAL FIELD

The present invention relates to towing systems, and more particularly to releasable ball mechanisms for the hitching mechanisms.

BACKGROUND OF THE INVENTION

Towing and hitching systems for vehicles are well known today. Ball and socket-type towing mechanisms are used on a wide variety of vehicles, such as automobiles, SUVs, trucks, tractors, and the like. The systems are used to tow various vehicles, such as trailers, mobile homes, other non-operating vehicles, and the like.

The ball member is part of a ball mechanism affixed to the towing vehicle. Typically, a subframe assembly, such as a hitch, is secured to the towing vehicle. The ball member is attached or otherwise secured to the hitch for use in towing the towed vehicle.

The socket is part of a coupler mechanism affixed to the trailer or towed vehicle. Generally, the coupler is secured to the tongue of the vehicle or trailer, usually a forward extension of the frame. The coupler typically includes a manually operated clamping arrangement which retains the ball member in the socket and thus the towed trailer or vehicle to the towing vehicle.

Often, the trailers and sockets are of different sizes, requiring ball members of different sizes. Also, in some instances, it is preferable to be able to remove the ball member for security purposes in order to protect it from corrosion, or to simply store it when it is not being used.

There is a need for removable ball mechanisms which can be removed in an easier manner and requires minimum sized holes cut in the vehicle bed where necessary. The ball mechanism should also prevent disconnection when towing and prevent incorrect hookup.

SUMMARY OF THE INVENTION

The present invention achieves the objects set forth above and provides an improved ball mechanism for use with vehicles. The invention includes a ball portion with an attached body portion and which fits quickly and easily within a hole in the vehicle. A screw member activates or is attached to a plunger member which is adapted to actuate a plurality of ball bearings. The ball bearings can engage and lock into grooves in the hitch member on the vehicle. The locking ball bearing are engaged by a plunger that is activated by the screw member which protrudes from the top of the ball member. When the screw member is rotated in one direction, the ball bearings are allowed to retract, allowing the ball member to be removed. When the socket and coupler mechanism on the trailer are installed, the coupler will not allow the screw member to be unthreaded sufficiently for the trailer ball member to be disengaged from the hitch receiver. Also, if the screw member is not properly secured to lock the ball members to the hitch, the trailer coupler and socket cannot be secured. This prevents an improper hookup.

All of the components of the present invention are located as part of the ball member. Thus, the ball member can be easily removed and stored in the vehicle cab when not in use to help prevent corrosion damage.

Other benefits, features, and advantages of the present invention will become apparent from the following description of the invention, when viewed in accordance with the accompanying drawings and appended claims

BRIEF DESCRIPTION OF THE DRAWINGS

FIG. 1 is an exploded view of the ball member and ball mechanism in accordance with a preferred embodiment of the present invention;

FIG. 2 illustrates the ball member of FIG. 1 as installed on a vehicle hitch member;

DESCRIPTION OF THE PREFERRED EMBODIMENT(S)

The present invention provides a removable ball goose hitch that requires a minimum cut hole size in the vehicle or truck bed. The ball member is removable from the vehicle without disconnecting from the side or underneath the vehicle. This makes the ability to remove the ball member from the vehicle easier and less complicated. The removable ball member also prevents disconnection while towing and prevents an incorrect hookup with the trailer or towed vehicle.

Figure 3:
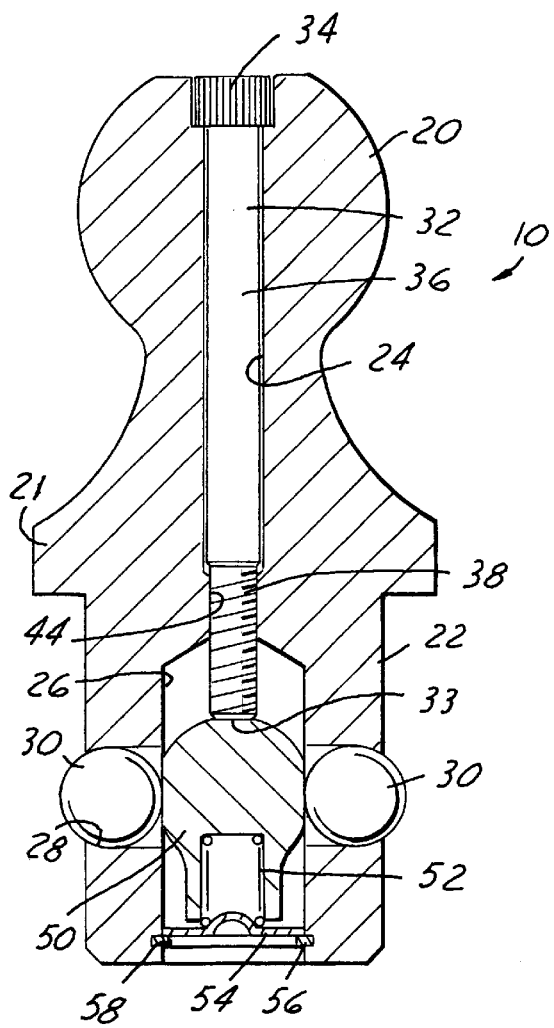
FIGS. 3 and 4 illustrate the secured and unsecured positions of the mechanism used to secure and unsecure the ball member to a hitching mechanism on a vehicle.
Figure 4:
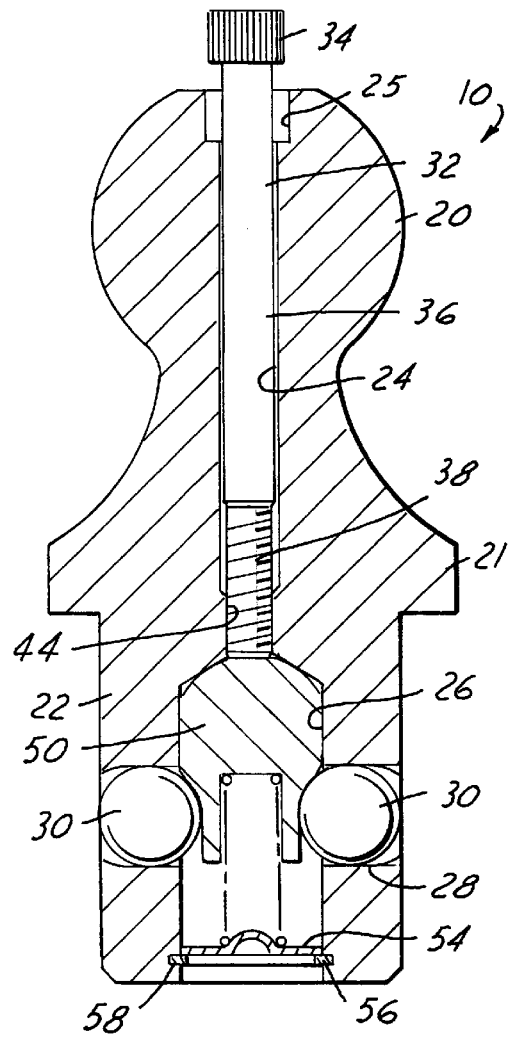
Figure 5:
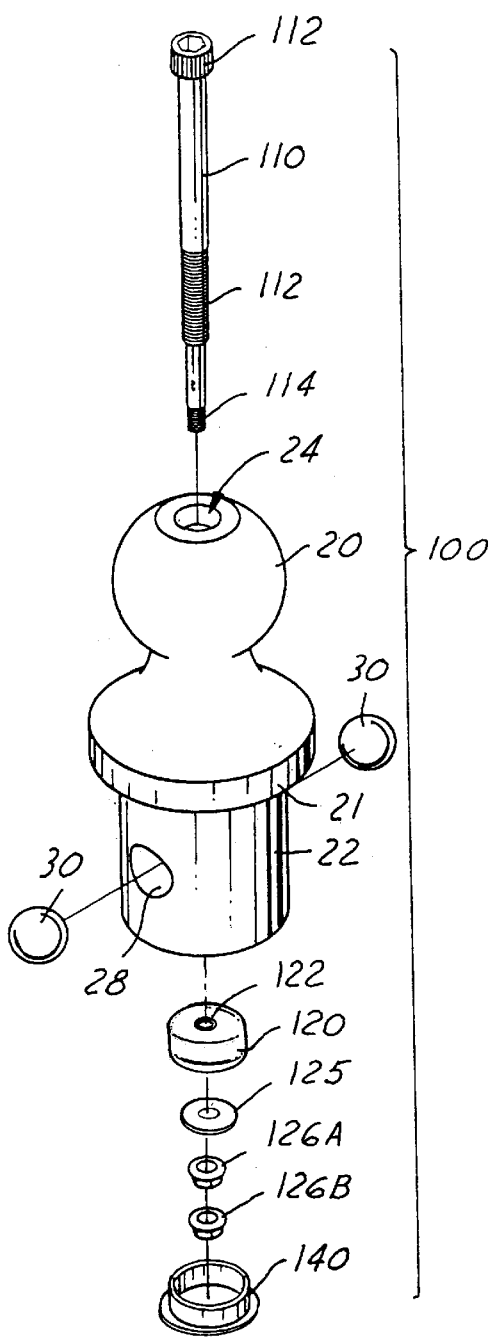
FIG. 5 illustrates an alternate preferred embodiment of the present invention.
Figure 6:
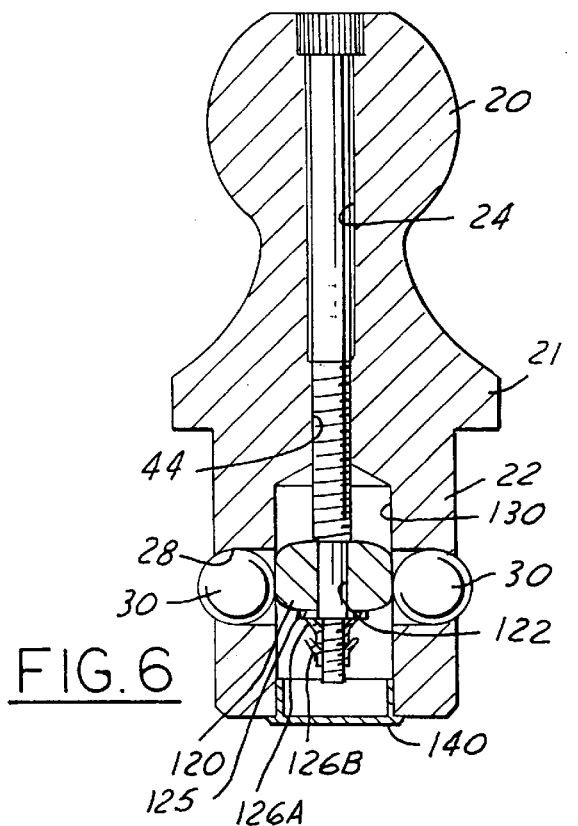
FIGS. 6 and 7 are cross-sections illustrating the secured and unsecured positions, respectively, of the embodiment of the invention shown in FIG. 5.
Figure 7:
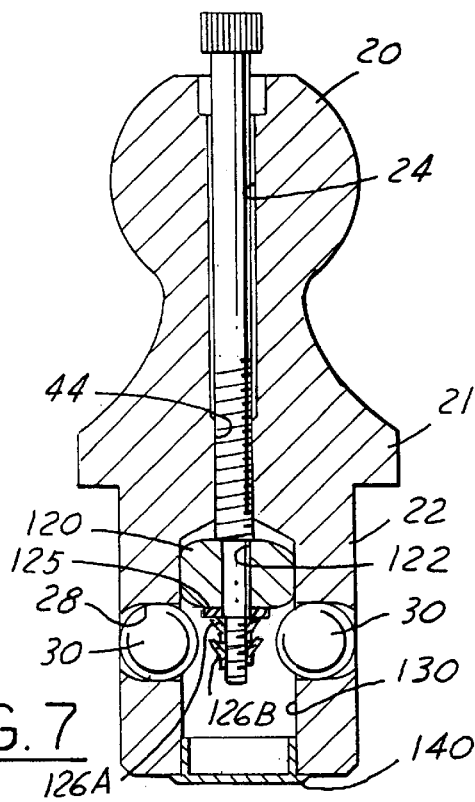

Two preferred embodiments of the present invention are described in this application. One preferred embodiment is shown in FIGS. 1–4 and a second preferred embodiment is shown in FIGS. 5–7. The present invention is not to be limited by the two embodiments illustrated and described, however, but the invention is to be given the full scope as defined by the appended claims.

The present invention generally relates to a ball member which is adapted to be positioned on a automobile, truck, SUV, or other vehicle and used for the purpose of connecting to or towing another vehicle, such as a trailer, mobile home, or the like. The ball member is adapted to be positioned in a receiver or opening in the towing vehicle and adapted to be connected to a coupling mechanism on the trailer or towed vehicle. The opening for the ball member is typically positioned on a hitch mechanism or system which is positioned on, or installed as part of, the towing vehicle. The socket is typically part of a coupling mechanism which is positioned on a frame or extension of the towed vehicle.

FIG. 1 is an exploded view of a first embodiment of the present invention and is referred to generally by the reference numeral 10. FIG. 2 is a partial cross-sectional view of the embodiment 10 shown connected to a hitch mechanism 12. The hitching mechanism 12 is connected to a vehicle (not shown). FIGS. 3 and 4 are cross sectional views of the ball member 10 illustrating the secured and unsecured positions of the ball member when it is secured to, and unsecured from, the vehicle.

The ball member 10 includes a ball portion 20 which is integrally attached to a body member 22. The ball portion 20 is of any conventional size known in the towing field today for attachment to coupling components and sockets. These sizes are typically the following: 1 inch in diameter, 1½ inches in diameter.

The ball member 10 has a central elongated passageway 24 which connects with an opening or cavity 26. The conduit 24 and cavity 26 extend generally longitudinally in the ball portion 20 and body member 22. The body member 22 also has a cross passageway or cavity 28 which is positioned generally transverse to the longitudinal direction of the body member 10. As shown in FIGS. 1–4, the opening 28 is adapted to hold a plurality of ball bearings 30. In this regard, although one cross-passageway 28 and two ball bearings 30 are shown in FIGS. 1–4, it is understood that there could be two or more similar passageways provided in the body member 22, as well as three, four or more ball bearings, one or two of them positioned in each of the passageways.

An elongated screw member 32 is positioned in the passageway 24. The screw member 32 includes a head 34, elongated shank 36, and threaded lower end 38. The head 34 can have an internal socket 40 as shown, or it could have any other means or mechanism for activating and rotating the screw member relative to the ball member. Other common tool mechanisms include slots for flat head screw drivers or cross-slots for Phillips head screwdrivers or the like.

The lower end 38 of the screw member 32 has a series of threads which mate with a threaded portion 44 in the passageway 24. In this manner, when a tool is used to rotate the screw member 32, the screw member can move longitudinally in the ball member. This is shown in particular from a comparison of FIGS. 3 and 4.

A plunger or actuation member 50 is positioned in the cavity 26. A coil spring member 52 is also positioned in the cavity 26 and used to bias the plunger member 50. A plate member 54 is positioned in the end of the cavity 26 in order to hold the plunger member and spring member in place. The plate 54 is held in place by a snap or locking ring 56. The locking ring is situated in groove 58 in the body member 22.

As shown in FIG. 2, the ball member 10 is adapted to be inserted into a receiver member 60 which is positioned on a plate or hitch member 12 on the vehicle. For this purpose, the ball member also has a flange member 21 thereon which is positioned between the ball portion 20 and the body portion 22. The flange portion 21 is adapted to rest on the receiver 60 as shown in FIG. 2.

An enlarged recess 25 is provided in the ball member in order to accommodate the head 34 of the screw member and allow the top of the head to become flush with the top of the ball portion 20. In this manner, when the head 34 is fully positioned in the recess 25, the socket of the coupling mechanism can be positioned and locked onto the ball portion 20. However, when the head 34 protrudes above the ball portion 20, as shown in FIG. 4, the socket member cannot be locked onto the ball member. This prevents incorrect hookup of the trailer to the vehicle.

As indicated above, the ball member 10 can be easily removed from the hitching mechanism 12, and can be removed in a manner which does not require disconnection from the side or underneath the vehicle. In order to connect and disconnect the ball member 10 from the vehicle, the screw member 32 is rotated or screwed into and out of the ball member. As shown in FIG. 3, when the screw member 32 is rotated downwardly, the screw end 33 of the screw member makes contact with the plunger or actuation member 50 and pushes it downwardly against the force of the spring member 52. This, in turn, forces the ball bearings 30 radially outwardly, holding the ball member in place. The locked position of the ball member 10 in the vehicle is shown in FIG. 2. As shown, the ball members mate with shoulder 64 on cylindrical chamber or bore 66 in the receiver 60. When the ball bearings 30 are extended in the matter shown in FIGS. 2 and 3, the ball member 10 cannot be removed from the receiver 60 or be disconnected from the hitching mechanism on the vehicle.

In order to remove the ball member 10 from the hitch mechanism and vehicle, the screw member 32 is rotated to the position shown in FIG. 4 The spring member 52 forces the plunger member 50 upwardly in the chamber 26 allowing the ball bearing members 30 to be retracted toward the center of the body portion 22.

As shown in the drawings, particularly FIGS. 3 and 4, all of the moving components of the ball member which allow it to be connected and disconnected to the hitch mechanism in the vehicle are self contained. That is, all of the components are integral within the ball member. In this manner, when the ball member is removed from the vehicle, all the components which could be corroded or affected by environmental conditions can be retained in a dry and secure condition for storage and out of contact with the elements. This maintains the ball member 10 in a better preserved condition for use and reuse relative to towing vehicles and the like.

Another preferred embodiment of the invention is shown in FIGS. 5–7 and referred to in general by the reference numeral 100. In general, the ball member 100 is similar to the ball member 10 described above, with the major difference being the fact that the screw member is directly attached to the plunger member so that activation of the screw member directly activates the plunger member without the necessity of using a spring or other biasing member or mechanism. At the present time, the embodiment shown in FIGS. 5–7 is preferred.

The components of the ball member 100 which are the same as those described above and referenced by FIGS. 1–4 are provided with the same reference numerals for convenience and ease of reference. These components include the ball portion 20, flange portion 21, body member 22, ball bearings 30, passageway 24, passageway 28, and threads 44 in the passageway 24.

The screw member 110 includes a head member 112, a first threaded section or portion 112 and a second threaded portion or section 114 at its lower end. The plunger member 120 has a central opening or passageway 122. When the plunger member 120 is positioned in the cavity 130 in the body portion 22, the lower end of the screw member 110 is inserted through the opening 122 and locked in place by threaded fasteners or nut-type members 126A and 126B. The nut-like members 126A, 126B are threaded onto the threaded portion 114 at the lower end of the screw member 110. A washer 125 is also provided.

A cap member 140 is positioned on the end of the body member 22 in order to protect the screw member and plunger member from dirt, dust, and other environmental elements. The cap 140 can be made of any material, such as plastic or metal.

While particular embodiments of the invention have been shown and described, numerous variations and alternative embodiments will occur to those skilled in the art. Accordingly, it is intended that the invention be limited only in terms of the appended claims.

What is claimed is:

1. A ball member for a trailer hitching system, the ball member comprising:
   a ball portion;
   a body portion;
   a longitudinal passageway in the ball member;
   a screw member threadedly positioned in said passageway;

a plunger member positioned in said passageway and actuated by said screw member as said screw member is rotated in said passageway and travels longitudinally therein; and at least one locking member actuated by said plunger member;

wherein when said locking member is actuated, the ball member is secured in position in the trailer hitching system.

2. The ball member as set forth in claim 1 further comprising a spring member in said passageway for biasing said plunger member in a direction not to actuate said at least one locking member.

3. The ball member as set forth in claim 1 where said plunger member is attached to said screw member.

4. The ball member as set forth in claim 1 further comprising means for covering one end of said passageway.

5. The ball member as set forth in claim 1 further comprising a transverse passageway in the ball member and wherein said at least one locking member is positioned in said transverse passageway.

6. The ball member as set forth in claim 5 wherein said locking member comprises a ball bearing member and wherein two ball bearing members are provided.

7. The ball member as set forth in claim 1 wherein said screw member is threadedly rotatable between a first locking position and a second unlocked position, and wherein in said first position, said screw member is completely hidden inside the ball member and wherein in said second position, said screw member protrudes from the ball member.

8. The ball member as set forth in claim 3 further comprising a nut member for securing said plunger member to said screw member.

9. The ball member as set forth in claim 5 wherein when said locking member is actuated, a portion of said locking member protrudes radially outwardly beyond said body position.

10. The ball member as set forth in claim 1 further comprising a flange portion positioned between said ball portion and said body portion.

11. A ball member for a trailer hitching system, the ball member comprising:

a ball portion;

a body portion;

a longitudinal passageway in the ball member;

a screw member positioned in said passageway;

a plunger member positioned in said passageway and actuated by said screw member; and at least one locking member actuated by said plunger member;

said screw member being threadedly rotatable between a first locked position and a second unlocked position, and wherein in said first position, said screw member is completely hidden inside the ball member and wherein in said second position, said screw member protrudes from the ball member, wherein when said locking member is actuated, the ball member is secured in position in the trailer hitching system.

* * * * *